US012433352B2

(12) United States Patent
Kartalov et al.

(10) Patent No.: US 12,433,352 B2
(45) Date of Patent: Oct. 7, 2025

(54) THERMALLY PROTECTIVE COMPOSITE ARTICLES, AND ASSOCIATED METHODS AND WETSUITS

(71) Applicant: THE UNITED STATES OF AMERICA, AS REPRESENTED BY THE SECRETARY OF THE NAVY, Arlington, VA (US)

(72) Inventors: Emil Paskalev Kartalov, Pacific Grove, CA (US); Andrew Thomas Vesey Waldron, Allentown, PA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 261 days.

(21) Appl. No.: 18/224,895

(22) Filed: Jul. 21, 2023

(65) Prior Publication Data
US 2024/0023644 A1    Jan. 25, 2024

Related U.S. Application Data

(60) Provisional application No. 63/391,093, filed on Jul. 21, 2022.

(51) Int. Cl.
*A41D 13/012*    (2006.01)
*A41D 31/06*    (2019.01)

(52) U.S. Cl.
CPC ......... *A41D 13/012* (2013.01); *A41D 31/065* (2019.02); *Y10T 428/24479* (2015.01)

(58) Field of Classification Search
CPC ............... A41D 13/012; A41D 31/065; Y10T 428/24779; B63C 11/04
See application file for complete search history.

(56) References Cited

U.S. PATENT DOCUMENTS

| 2002/0026664 | A1* | 3/2002 | Grounds | A41D 13/012 2/467 |
| 2004/0142149 | A1* | 7/2004 | Mollendorf | C08J 9/35 428/156 |
| 2010/0009159 | A1* | 1/2010 | Kimberly | B29C 70/60 428/338 |
| 2013/0042377 | A1* | 2/2013 | Moore | B63C 11/04 2/2.15 |

OTHER PUBLICATIONS

Bardy, E., Mollendorf, J., & Pendergast, D. (Sep. 2005). Thermal conductivity and compressive strain of foam neoprene insulation under hydrostatic pressure. Journal of Physics D: Applied Physics, 38 (20). Retrieved from https://doi.org/10.1088/0022-3727/38/20/009 1.

(Continued)

*Primary Examiner* — Donald M Flores, Jr.
(74) *Attorney, Agent, or Firm* — Heber Martin Carbajal; Scott Bell

(57) ABSTRACT

A flexible, thermally-insulating composite article includes: a base layer; a plurality of teeth extending from the base layer; and grooves extending between the teeth to enable the teeth to converge. The composite article may be in the form of a pad insertable into a pocket associated with a wetsuit.

19 Claims, 2 Drawing Sheets

(56) References Cited

OTHER PUBLICATIONS

Brown, J., Oldenkamp, J., Gamache, R., Grbovic, D., & Kartalov, E. (Feb. 2019). Hollow-microsphere composite offers depth-independent superior thermal insulation for diver suits. Materials Research Express, 6 (5). Retrieved from https://doi.org/10.1088/2053-1591/ab0447 2.

Kwong-Wright, A. (2021). Composite thermal wetsuit (M.S. thesis). Dept. of Physics, NPS, Monterey, CA, USA. 2.

Martin, S. (2020). Building and testing an incompressible thermally insulating cold temperature diving wetsuit (M.S. thesis). Dept. of Physics, NPS, Monterey, CA, USA. 2.

Rainey, C. (1998). Wet suit pursuit: Hugh bradner's development of the first wet suit (Tech. Rep.). San Diego, CA: Scripps Institution of Oceanography. Retrieved from https://escholarship.org/uc/item/7353g3dj 1.

Rodrigue, J.-P. (2020). Chapter 5—maritime transportation. In the geography of transport systems (fifth edition). New York, NY, USA: Routledge. Retrieved from https://transportgeography.org/contents/chapter5/maritime-transportation/draft-containership-capacity/ 2.

U.s navy diving manual (7th ed.) [Computer software manual]. (2016). 1, 2.

Zunz, A. (Sep. 22, 2021). How deep can you scuba dive? Scuba Diving. Retrieved from https://www.scubadiving.com/why-is-130-feet-depth-limit-for-recreational-scuba-diving 2.

* cited by examiner

THERMALLY PROTECTIVE COMPOSITE ARTICLES, AND ASSOCIATED METHODS AND WETSUITS

CROSS-REFERENCE TO RELATED APPLICATIONS

The present application claims priority to U.S. Provisional Patent Application Ser. No. 63/391,093, filed Jul. 21, 2022, which is incorporated by reference herein in its entirety.

BACKGROUND

The present disclosure relates to thermally protective composite wetsuit materials for divers and a flexible, patterned architecture fTeor molding composite materials, particularly to a grooved "chocolate bar" shape that adapts to various body curvatures.

The present disclosure improves the incorporation of stiff composite materials into traditional neoprene diving wetsuits by casting these composites into flexible shapes.

Sea water has 4 times the heat capacity and 24 times the thermal conductivity of air. As a result, even evolutionarily adapted sea mammals lose heat 4.5 times faster in water than in air. That heat loss leads to hypothermia even more rapidly with human divers. After 1 hr in 10° C. water, or ¼ hr in 5° C. water, a diver's core temperature would fall below 35.5° C. and the diver would enter hypothermia, leading to loss of consciousness, organ damage, and eventually death. While physical conditioning can buy extra time underwater, it cannot fully compensate for the heat loss. Thermal protection extends the operability timetable during long dives in cold waters. Thermal protection is typically provided by a wetsuit. The wetsuit is stitched and/or glued together from tailored pieces of a 3-8 mm bubbled neoprene layer sandwiched between two 0.2 mm layers of cloth. The microscopic air bubbles in the neoprene make it flexible and thermally resistive, as air is a good thermal insulator. In 5° C. water, a 3 mm neoprene suit would extend the time to hypothermia from 15 min to 1 hr, while a 5 mm suit would extend it to 1.5 hr. Thicker suits offer more thermal protection but are less flexible. That makes movement more difficult and fatigues the diver faster. As a result, the thickest single suit on the market is 8 mm, while US Navy divers typically use 7/6 mm neoprene suits (7 mm chest, 6 mm limbs) as a compromise between protection and ergonomics. Thicker neoprene is also more positively buoyant, which requires divers to add more ballast to compensate for it. This also means larger differences between the ballast needed at the surface and at depth. To illustrate, a 3 mm wetsuit needs 2 kg ballast at the surface and 1 kg at depth, while a 7 mm wetsuit needs 6 kg ballast at the surface and 2 kg at depth. This difference is typically dealt with using a BCD (buoyancy control device). However, the BCD taxes the attention of the diver to adjust manually and continually through the dive, thus distracting him from his primary tasks. The BCD also requires some expenditure in breathing gas, which shortens the available diving time. Overall, thicker neoprene suits incur significant loss of ergonomics compared to thinner suits.

A further problem of the neoprene suits is that the air bubbles providing the thermal protection shrink with depth as the ambient pressure increases, thereby degrading thermal protection. Lab tests have shown that 8 mm neoprene from a top-of-the-line commercial suit loses ~50% thermal insulance at 30 msw, compared to sea level.

To address these issues, a "K1" suit was previously developed. K1 featured composite plates fitted to non-bending areas of the body. The composite was made of hollow glass microspheres embedded in thermally cured silicone cast in 3D-printed molds designed from 3D scans of the diver's body. The K1 combined the ergonomics of a 3 mm suit with thermal protection superior to a 7 mm suit. The first version of the K-suit offered improved thermal protection coupled with superior flexibility, when compared with commercial 7 mm neoprene suits. However, it also had significant positive buoyancy as the composite effective density was ~500 kg/m 3. The positive buoyancy meant the diver needed to compensate for it by increasing the carried load of ballast. That increased the overall inertial mass, slowing the diver down, while the ballast carried around the waist also worsened the weight distribution of the diver. Next, the composite was used to build the K1 suit by casting the material in 3D printed polycarbonate molds fashioned from the digital segments of 3D scans of the body of the diver. The cast composite segments were attached to a 3 mm neoprene undersuit by encapsulating them within matching tailored external pockets glued to the undersuit. The segments were designed to cover the non-bending parts of the body, while the bending parts were only covered with the 3 mm undersuit. The result was that K1 had the flexibility and ergonomics of a 3 mm suit, but its thermal protection exceeded the one of a commercial 7 mm suit, thereby offering the best of both worlds.

The K1 was modified by changing the content of the composite in such a way that its effective density approaches neutral density. In addition, further improvement of thermal protection was also desirable. These features were combined in the "K2" suit. The K2 utilized the same approach of composite casts from molds designed off body scans of the diver, but the individual segments were reinforced with an additional thin layer of solid ceramic microspheres embedded in silicone. This extra layer in the same pocket provided the additional thermal protection, as well as raised the effective density to near neutral buoyancy, improving the suit's weight-distribution ergonomics for the diver. This second composite was made of solid ceramic microspheres embedded in silicone. The result was that the K2 suit featured even better thermal protection with the same flexibility, while also approaching neutral buoyancy. Neutral buoyancy further improved the ergonomics as it decreased the needed ballast, improved weight distribution, and thus decreased the straightening torque that divers experience in water.

However, both K1 and K2 were based on individually shaped molds, which made fabrication difficult and expensive. While highly successful as suits, both K1 and K2 were difficult to manufacture due to the segments being molded to specific body scans. The custom body scans and matching 3D-printed molds maximize the quality of the suit's fit to the diver's body. However, on the flip side, this method means that scans and molds must be made for each diver individually, because of the wide ranges of human body types, proportions, and sizes. This would make mass production of such suits difficult and expensive, ultimately limiting the general use and accessibility of the technology.

BRIEF DESCRIPTION

In order to overcome the inflexibility of cast glass microsphere composite materials, articles can be modeled, and the composite material can be cast them into geometries containing a symmetric array of thick trapezoidal teeth, with thin grooves separating them. When bent the teeth converge into a curvilinear surface approximation, similar to a body curve.

The present disclosure relates to several steps used to produce this geometric shape. Using CAD software, an array of trapezoidal teeth are drawn on a thinner rectangular base. The base is filleted to promote lamination between the teeth and the base material. A mold is produced by taking the positive image of the model and inserting a cavity into a rectangular box. A complete mold is made by adding a perimeter to the base mold containing the cavity. Then, a mold lid is sized and drafted to fit in the base. Holes are added to the lid to allow excess material to come out of the mold and to allow air bubbles to ventilate from the composite surface. The mold is finally 3D printed. The silicone glass microsphere polymer is mixed in a planetary centrifuge. Multiple mixtures are poured into a single container and desiccated. The degassed mixture is poured into the mold, placed in an oven, and then air cooled. The hardened polymer is removed from the mold by scraping away the excess composite material between the lid and mold bottom interface. The lid is then pried from the mold bottom. The composite base surface is held to the lid by the hardened excess material through the vent holes. The whole composite tooth array is removed from the surface by scraping it off the mold lid. Multiple composite pieces can be made from one sample. Often a larger sample of bulk material is cast and then cut into smaller rectangular pieces, along the thinner grooves, to cover specific areas of the body.

Disclosed, in some embodiments, is a flexible, thermally-insulating composite article including: a base layer; a plurality of teeth extending from the base layer; and grooves extending between the teeth to enable the teeth to converge.

In some embodiments, the teeth include a carrier polymer matrix and particles dispersed in the carrier polymer matrix.

The particles may be microspheres.

In some embodiments, the microspheres are solid. In other embodiments, the microspheres are hollow. It is also contemplated that a combination of solid and hollow microspheres may be utilized.

The microspheres may include glass microspheres and/or ceramic microspheres.

In some embodiments, the plurality of teeth are arranged in a symmetric grid.

The plurality of teeth may be in the shape of truncated square pyramids.

In some embodiments, grooves define a filleted surface between adjacent teeth.

The filleted surface may be a concave filleted surface.

In some embodiments, the particles are glass or ceramic microspheres; the plurality of teeth are arranged in a symmetric grid and are in the shape of truncated square pyramids; and the grooves define a concave filleted surface between adjacent teeth.

Disclosed, in other embodiments, is a diving suit including: a suit base layer; at least one pocket; and at least one flexible, thermally-insulating composite pad within the at least one pocket. The at least one composite pad includes: a pad base layer; a plurality of teeth extending from the pad base layer; and grooves extending between the teeth to enable the teeth to converge.

The suit base layer and the at least one pocket may contain neoprene.

In some embodiments, the teeth include a carrier polymer matrix and particles dispersed in the carrier polymer matrix.

The particles may include microspheres.

In some embodiments, the plurality of teeth are arranged in a symmetric grid and comprise truncated square pyramids.

The grooves may define a concave filleted surface between adjacent teeth.

Disclosed, in further embodiments, is a method of producing a diving suit including: providing at least one flexible, thermally-insulating composite pad to at least one pocket of a diving suit precursor, wherein the diving suit precursor further includes a diving suit base layer. The at least one composite pad includes: a pad base layer; a plurality of teeth extending from the pad base layer; and grooves extending between the teeth to enable the teeth to converge.

In some embodiments, the teeth inlcude a carrier polymer matrix and glass or ceramic microspheres dispersed in the carrier polymer matrix.

In some embodiments, the plurality of teeth are arranged in a symmetric grid and comprise truncated square pyramids.

These and other non-limiting characteristics are more particularly described below.

Disclosed, in other embodiments, is a method of providing flexible thermal insulation by casting a thermally resistive material into a grooved mold, wherein the grooves allow the cast teeth and base to bend more easily and converge, thereby allowing the insulation to match and follow the shape of the body to be thermally insulated.

In some embodiments, the thermally resistive material is a composite made of carrier polymer and microspheres, wherein the microspheres provide most of the thermal insulation and adaptability to different casting shapes.

The microspheres may be hollow glass microspheres, hollow ceramic microspheres, solid glass microspheres, solid ceramic microspheres, or a combination of two or more thereof. Non-limiting examples of suitable diameters include 10 μm to 500 μm, including 10 μm, 50 μm, 100 μm, 200 μm, 500 μm, and any ranges defined by two endpoints selected therefrom.

In some embodiments, the tooth pattern is one of a symmetric grid (optionally of cubes, pentagons, hexagons, cylinders and/or constant top surface sizes (e.g., of 3 centimeters)) drafted to a wider bottom surface size.

The grooves between teeth of the same dimensions may have a wedge shaped cross section that terminates at a rounded fillet.

In some embodiments, the perimeter of each tooth base has a rounded fillet, e.g., of 0.5 millimeter radius.

The wedge-shaped cross section angle, (e.g., of 72.81 degrees), may produce a maximal bend, (e.g., of 50 millimeter radius of curvature).

In some embodiments, the grooves are positioned only on one side of the cast, thereby allowing the cast to be bent in one direction that closes the teeth formed by the grooves and thus allows a better thermal protection onto the shape of the body to protect.

The grooves may be formed on multiple sides of the cast shape (e.g., cubes, pentagons, hexagons, etc.) allowing the material to bend in multiple directions, thereby being able to close the respective teeth formed by the grooves in multiple directions, and enabling the thermal protection of concave and convex surfaces on the same body (e.g., a surface shaped like the capital letter S, a spherical surface).

In some embodiments, the grooved thermal insulation is for a diver suit.

The grooved thermal insulation may be cast in uniform standardized molds, allowing for divers of various size to be fitted using the same starting grooved plates by trimming those plates to fit the particular diver.

In some embodiments, the grooved insulation is cut and fit to the particular diver's body surfaces, bent to fit as needed and to close the teeth, and encapsulated in external waterproof pockets onto a thin wetsuit or body glove, to produce a thermally insulated diver suit.

The external pockets may be attached to precut thin neoprene to produce a watertight pocket holding the composite piece onto the wetsuit or body glove.

In some embodiments, the grooved thermal insulation is for a watercraft, e.g., ships, boats, water skis, and submersibles.

The grooved thermal insulation may be for fluid pipes or gun barrels.

In some embodiments, the grooved thermal insulation is cast in multiple pieces in multiple different molds each geared towards a different maximal radius of curvature, to allow for addressing a range of curvatures onto the target body to be thermally protected.

Multiple pieces of different curvatures may be used to assemble efficient protection for a body of varying radii of curvature (e.g., the human body, complex system of pipes of different sizes, watercraft of complex shape).

In some embodiments, multiple pieces of the same molds are used to produce a complete diver suit for a human diver regardless of body size and proportions of the particular diver, leading to efficient and low-cost manufacturing processes for a diverse population of divers.

Two mold patterns may be used to cast plates to fit all major parts of a diver, wherein the parameters are: a) Mold 1 with 30 millimeter square tooth top width and maximal radius of curvature of 50 millimeters; b) Mold 2 with dimensions 30 millimeter square tooth top widths and maximal radius of curvature of 250 millimeters. Mold 1 and Mold 2 both have 0.5 millimeter radius fillets at the base of the teeth. The groove width increases with varying draft angles of the teeth. Mold 1 has a draft angle of 72.81 degrees and Mold 2 has a draft angle of 86.56 degrees. The offset perimeter from the base was dependent on a 45 degree draft on the Mold 1 and Mold 2 lid inserts. The respective perimeter offset was equal to the thickness of the base on which the teeth sat, e.g., a two millimeter base has a two millimeter base offset.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
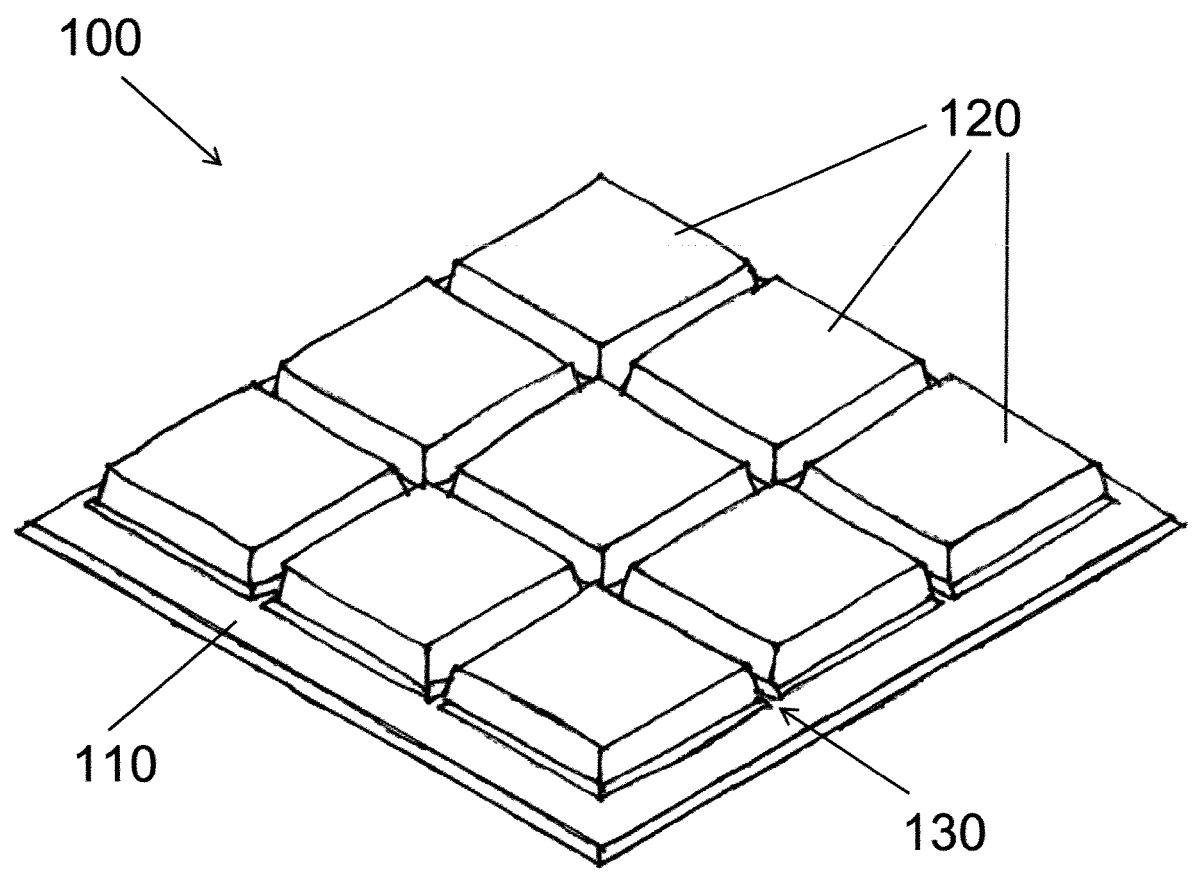
FIG. 1 is a perspective view of a flexible composite in accordance with some embodiments of the present disclosure.

The present disclosure may be understood more readily by reference to the following detailed description of desired embodiments included therein, the drawings. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

It is an object of the present disclosure to develop a composite wetsuit material with superior flexibility and thermal protection to conventional five to eight millimeter cold water diving wetsuits.

The present disclosure relates to casting a silicone microsphere composite into patterned geometries that adapt to different body curvatures. The grooved "chocolate bar" or "chocobar" (referred to as such due to an obvious visual analogy to the striations on a chocolate bar) shape geometry of this design includes an array of trapezoidal teeth on top of a thinner base. The thinner base and grooves enable the teeth of stiff composite to converge into an approximate curved shape. These curves can be optimized to specific radii of curvature on a human body. This technique improves the incorporation and production of silicone glass microsphere composites in diving wetsuits. The molds required to produce these, originally flat pieces, are much less expensive and time consuming to produce. The removal of the cast composite pieces and any excess material from the mold is easier. The simple geometry of the chocobar is easier to model and adapt in computer software, simplifying the design of the composite pieces in the suit.

The standardized flexible composite pads of the present disclosure can be trimmed to fit any diver. This significantly simplifies fabrication and lowers cost. Field tests of the "K3" suit that includes the pads versus commercial neoprene suits demonstrated thermal protection that was 4.5° C. better than a 7/6 mm suit and on par with a top-of-the-line 8 mm suit, while featuring superior flexibility and ergonomics. The K3 is an important development in diving suit technology and should be of strong interest to commercial, recreational, and military divers.

The wetsuits can be built from a universal composite segment, which can be mass produced by casting from standardized molds, and then trimmed to fit each diver appropriately during the tailoring process. To provide the necessary flexibility and variable curvature, the segment geometry can be based on identical truncated square pyramids arranged in a rectangular array. The result is a segment that can be easily bent to fit the body and follow its curvature.

The K3 prototype diver suit is presented herein. Built by the new universal chocobar technique, the K3 is far easier to manufacture than its predecessors the K1 and the K2 suits. Field test results showed the K3 outperformed a standard heavy-duty XCEL Thermoflex 7/6 mm suit by +4.5° C. at depth. K3 was not as thermally protective as a Long-Johns 15/7.5 mm suit but achieved thermal parity at depth with a top-of-the-line SOLAFLEX 8/7 mm suit. K3 also outperformed all three commercial suits in ergonomics of flexibility but required extra ballast to compensate for high positive buoyancy. Overall, the K3 is a combination of high manufacturability, improved thermal protection, and superior ergonomics of flexibility. Hence, the K3 is an outstanding new option available to commercial, military, and recreational divers.

FIG. 1 illustrates a composite article 100 in accordance with some embodiments of the present disclosure.

The composite article 100 includes a base layer 110, a plurality of teeth 120, and grooves 130 extending between the teeth to enable the teeth to converge.

The grooves may be formed at the surface of the base layer upon which the teeth are located, on the opposite surface, or on both of these surfaces.

The base layer and the teeth may be formed for the same or different compositions. In some embodiments, the base layer and the teeth are formed as a unitary article from the same composition (e.g., in a mold or additive manufacturing process). In other embodiments, the teeth are formed on a preexisting base layer. In further embodiments, the base layer and the teeth are formed separately and the teeth are adhesively or otherwise laminated onto the base layer.

The microspheres may be packed to make up a volume of between about 5 vol % and about 74 vol % of the teeth and/or bae layer, including from about 10 vol % to about 55 vol %, from about 15 vol % to about 55 vol %, from about 20 vol % to about 55 vol %, from about 25 vol % to about 55 vol %, from about 30 vol % to about 55 vol %, from about 35 vol % to about 55 vol %, from about 40 vol % to about 55 vol %, from about 45 vol % to about 55 vol %, and from about 50 vol % to about 55 vol %.

The microspheres may have a mean particle diameter in a range of about 1 μm to about 999 μm, including from about 5 μm to about 500 μm, from about 10 μm to about 200 μm, from about 15μ to about 150 μm, from about 20 μm to about 125 μm, from about μm to about 100 μm, from about 30 μm to about 90 μm, from about 40 μm to about 80 μm, from about 50 μm to about 75 μm, and from about 60 μm to about 70 μm. In some embodiments, all of the microspheres have diameters within one of these ranges. It should be understood that the upper and lower limits of each range may be combined.

The microspheres may be hollow glass and/or hollow ceramic microspheres, filled with vacuum, air, nitrogen, or noble gases.

When ceramic microspheres are utilized, the ceramic may be in the form of a carbide, an oxide, or a nitride in some embodiments. Non-limiting examples of ceramic materials include boron carbide ($B_4C$), aluminum oxide ($Al_2O_3$), silicon carbide (SiC), boron nitride (BN), silicon nitride ($Si_3N_4$), and zirconium oxide ($ZrO_2$).

Alternatively, the microspheres may be solid glass or solid ceramic microspheres.

The carrier polymer may be a siloxane-containing polymer or a polyurethane. In particular embodiments, the carrier polymer is a silicone polymer, such as polydimethylsiloxane.

Figure 2:
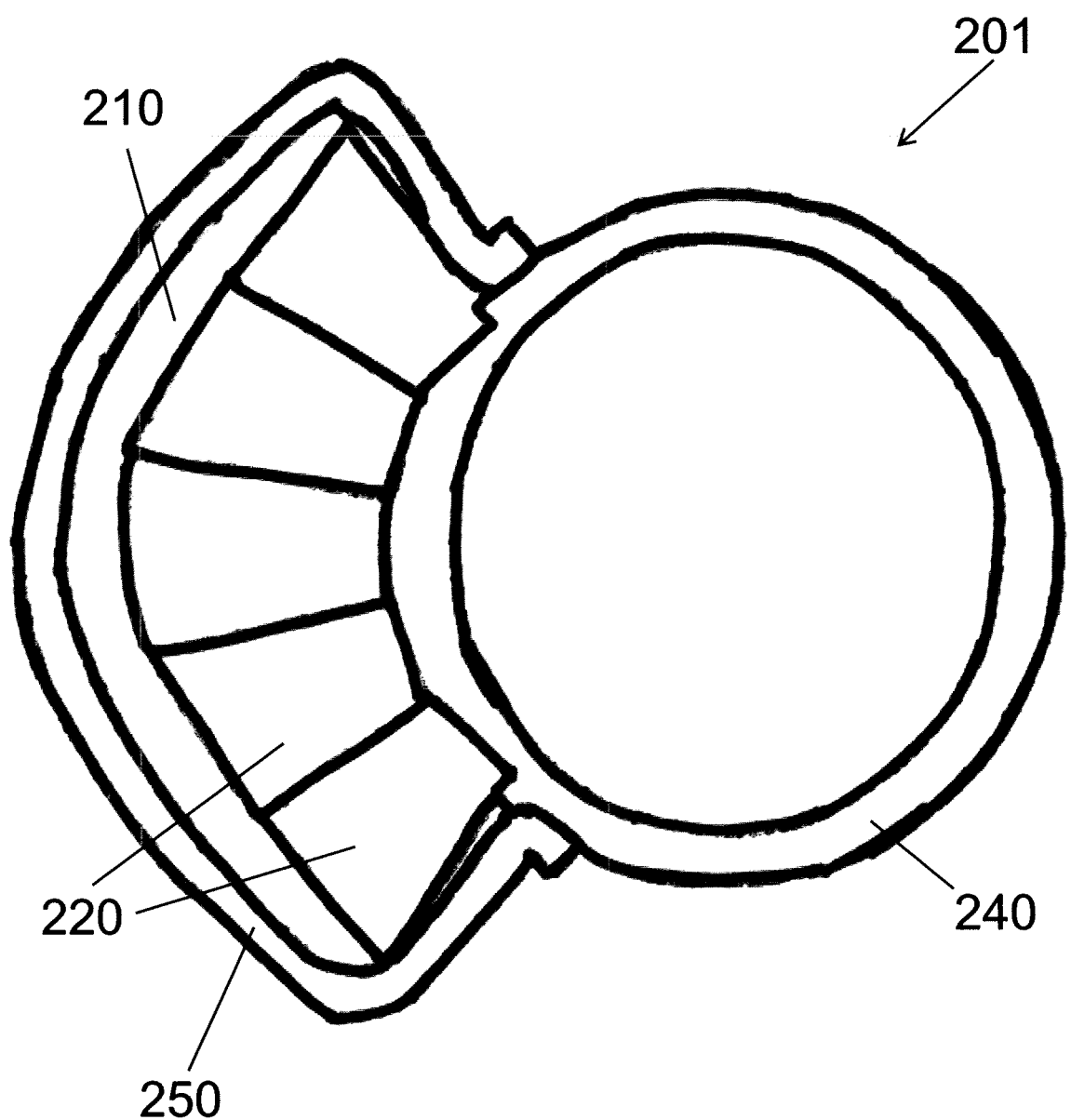
FIG. 2 is a cross-sectional view of a wetsuit including a flexible composite in accordance with some embodiments of the present disclosure.

FIG. 2 illustrates a non-limiting embodiment of a wetsuit 201 in accordance with some embodiments of the present disclosure. The wetsuit 201 includes base suit layer 240 and at least one pocket 250. Contained within the at least one pocket 250 is a composite pad including a pad base layer 210, a plurality of teeth 220 on the pad base layer 210, and grooves extending between the teeth to enable the teeth 220 to converge.

The pad in FIG. 2 may be similar to the article depicted in FIG. 1. For example, the base layer may be substantially flat before being inserted into the pocket but its flexibility allows conformity to a wearer's body part within base suit layer 240.

Although the composite pads have been described herein primarily with respect to wetsuit applications, it should be understood that other applications are also contemplated. For example, the composite pads may be used to provide insulation for watercraft (e.g., ships, boats, water skis, submersibles), pipes, or gun barrels.

Some aspects are also disclosed in "Ergonomic Segmented Composite Diving Suit with Superior Thermal Protection and Enhanced Manufacturability through Chocobar Technique" by Clark et al., *J Ergonomics*. 13:350, May 2023, DOI: 10.35248/2165-7556.23.13.350, which is incorporated by reference herein in its entirety. US Patent Application Pub. No. US 2022/0386714 A1 by Kartalov, published Dec. 8, 2022, is also incorporated by reference herein in its entirety.

The following examples are provided to illustrate the devices and methods of the present disclosure. The examples are merely illustrative and are not intended to limit the disclosure to the materials, conditions, or process parameters set forth therein.

Examples

Body Curvature

Measurements of the width and height of the chord of different parts of the body were collected and used to calculate corresponding radii of curvature. The results were organized in a histogram, which showed two peaks centered approximately at R1=50 mm and R2=250 mm, respectively.

Molds and Casts

Molds were designed for two types of chocobar arrays (R1=50 mm and R2=250 mm). The designs were 3D printed in polycarbonate using a Fortus 400 mc 3D printer (Stratasys, Eden Prairie, MN, USA). Sylgard 184 (Dow Corning, Midland, MI, USA) prepolymer was mixed with K1 hollow glass microspheres (3M Corp.) in a planetary mixer (ARE310, THINKY, Japan) for 4 min at 1500 rpm, degassed in a large dessicator vessel attached to a mechanical vacuum pump, poured into the molds, and cured in the molds in a Forced Air Oven (VWR) at 80° C. for 2 hours. The chocobar casts were extracted from the molds and deflashed.

Thermal Characterization of Chocobar Segments

Matching pairs of cylindrical aluminum inserts were machined to have one side flat and the other to have a cylindrical surface matching one of the two set curvatures (R1=50 mm and R2=250 mm). Each of the matching pairs was assembled with a corresponding chocobar segment and sandwiched between a heater element and an aluminum table inside a pressure vessel. The aluminum table stood in a mixture of melting ice and water, while the heater element was set to be maintained at 37° C. by an external electronic controller, which displayed the applied DC voltage and the electrical DC current supplied to the heater. Applying air pressure to the pressurized vessel simulated saltwater pressure at depth. Additional flat composite circular pads were added on top of the heater to minimize heat loss to the surrounding air. In steady state, the voltage and current were used to calculate the thermal insulance of the sample.

Suit Assembly

The chocobar composite segments were fitted onto a 3 mm neoprene undersuit worn by Diver A, trimmed appropriately in matching pairs forming a double layer. The pairs were then attached to the undersuit by encapsulating them inside external pockets made by gluing tailored thin neoprene to the undersuit, using neoprene cement. Aquaseal was then applied to the glue lines to strengthen them. This completed the suit and made it ready for field trials.

Biometric Data

For each diver participating in the field tests, biometric data was collected using ES-26M-W Smart Body Analyzer (FITINDEX, fit-index.com). The results were anonymized in compliance with (HIPAA) Health Insurance Portability and Accountability Act regulations. The anonymized biometrics is presented in Table 1.

TABLE 1

Biometric Data for Divers.

|  | Diver A | Diver B |
| --- | --- | --- |
| gender | male | male |
| Height, cm | 180 | 180 |
| Weight, kg | 75.05 | 86.95 |
| Age, yr | 31 | 29 |
| BMI, kg/m$^2$ | 22.9 | 26.8 |
| Body Fat, wt % | 11.9 | 20.9 |
| Fat-free Body Weight, kg | 66.08 | 68.8 |
| Subcutaneous Fat, wt % | 10.2 | 18 |
| Visceral Fat | 6 | 10 |
| Body Water, wt % | 63.6 | 57.1 |
| Skeletal Muscle, wt % | 56.9 | 51.1 |
| Muscle Mass, kg | 62.8 | 65.3 |
| Bone Mass, kg | 3.3 | 3.44 |
| Protein, wt % | 20.1 | 18 |
| BMR, Kcal | 1797 | 1855 |

In each dive, Diver A wore the K3 suit, while Diver B wore a commercial dive suit. In each dive, the two divers maintained the same depth and close proximity (<0.9 m), including swimming hand-in-hand in poor visibility and swift currents. Different dives tested against different arrangements of commercial systems. OM-CP-PR-TEMP1000 dataloggers (Omega Engineering, Norwalk, CT) were used to record the pressure and temperature digitally and automatically. Each diver wore a logger under his suit at the breastbone. Diver A also wore an additional logger inside his BCD (Buoyancy Control Device) mesh, to record the ambient water temperature.

Dive Test #1, was conducted at Whaler's Cove in Point Lobos State National Reserve. Diver A wore the K3, while Diver B wore an XCEL Thermoflex TDC 7/6 mm high-performance dive suit. The average water temperature was 12.6° C. and maximal depth was 15 m. Diver A noted a small leak through the wrist cuff during the dive. In Dive Test #1, Diver B wore a commercial high-performance 7/6 mm neoprene suit. This means 7 mm thickness on the chest and 6 mm thickness on the limbs. The results show that the K3 suit outperformed the 7/6 mm suit in thermal protection by ~4.5° C., while also offering the ergonomics of flexibility of a 3 mm suit. This is a major improvement of important practical consequences, as a 7/6 mm suit is a standard suit for US Navy standard thick suit for recreational divers. A significantly warmer, less obstructive suit should make a huge practical difference. The shown advantage (~4.5° C.) also compares favorably to the K2 suit's advantage (1° C.) over a 7 mm suit. Hence, K3 improves upon K2 by ~3.5° C. in thermal protection. Diver A also reported a small water leak in the wrist cuff, which must have somewhat degraded the K3 suit's performance, as measured in that dive.

Dive Test #2, was conducted at San Carlos Beach in Monterey, California. Diver A wore the K3, while Diver B wore a Yazbeck Long-John suit, featuring two pieces of 7.5 mm thickness each. As they overlapped at the torso, the resulting effective protection was 15/7.5 mm neoprene. The average water temperature was 12.6° C. and maximal depth was 15 m. The visibility was 3-4.5 m and the maximal depth achieved was 15 m. In Dive Test #2, Diver B wore a commercial Yazbeck Long-Johns neoprene suit. This is a suit made of two 7.5 mm parts that overlap at the torso, providing a double layer. So, the equivalent is a 15/7.5 mm in standard nomenclature. The results show that at depth, the Long-Johns outperformed the K3 by ~6° C. at depth. This is a large improvement compared to the same suit outperforming the K2 by ~11° C. in similar conditions. So, this indirect comparison shows that K3 outperformed the K2 by ~5° C. In addition, the K3 absolute performance was about the same in both Dive #1 and Dive #2, namely a drop of ~4° C. in temperature difference when moving from the surface down to 15 m of depth. This confirmation shows that the K3 performs consistently.

Dive Test #3, was conducted at San Carlos Beach in Monterey, California. Diver A wore the K3, while Diver B wore an Aqualung SOLAFLEX 8/7 mm top-of-the-line neoprene suit. The SOLAFLEX boasted additional features, such as a neck dam and integrated hood, fleece lining, across-the-chest zipper with double lining, and semi-dry cuffs on the wrists and ankles. The SOLAFLEX is the highest-thermal-performance wetsuit produced by Aqualung. In Dive Test #3, Diver B wore an Aqualung SOLAFLEX 8/7 mm top-of-the-line neoprene suit. The SOLAFLEX boasted additional features, such as a neck dam and integrated hood, fleece lining, across-the-chest zipper with double lining, and semi-dry cuffs on the wrists and ankles. The SOLAFLEX is the highest-thermal-performance wetsuit produced by Aqualung. This performance is achieved using the above features but also at the cost of highest thickness and worsened ergonomics. The results show that the 8/7 mm suit rapidly lost its advantage during the move from the surface to operational depth, where the K3 achieved parity in thermal protection while maintaining significant superiority in ergonomics of flexibility. These results establish the K3 as the better solution at depth.

The basic idea is to have universal segments that can be fitted to any diver. This would avoid the need for individual body scans and customized molds. To achieve this mechanically, the composite segments must be bendable. However, the composite material itself is less flexible than bubbled neoprene at the same thickness. So, the approach taken was to minimize the thickness in terms of bending, while maximize the thickness in terms of thermal protection. To achieve both at the same time, the universal segment was designed as a 2D array of truncated square pyramids. As a result, the composite segment is easy to bend along the striations, as the flexibility is largely determined by the thickness t of the shared base, while the thermal protection is governed by the combined thickness (h+t). Different values of the geometric parameters of the truncated pyramid would key into different radius of curvature at maximal bending. This raised the question which values of that radius would be needed for maximized coverage of a human body. That brought the need to measure the radius of curvature of different body parts, which was done by measuring the corresponding chords' thicknesses and heights. The results were organized in a histogram, which showed two peaks, approximately at $R1=50$ mm and $R2=250$ mm. This proved that just two types of universal molds would be sufficient to cast all pieces needed for a diver suit. Essentially, the larger radius produces a flatter segment useful to cover the pectoral, abdominal, and dorsal areas, while the smaller radius produces a far more curved segment useful to cover the limbs.

Accordingly, molds were designed, 3D printed, and used to cast universal composite segments. It made sense to characterize these segments in terms of thermal insulance versus applied pressure, as it was previously done with flat round samples of the composite. The test station had to be modified to accommodate the new geometry. Sandwiching the chocobar segment between two flat surfaces would not be fair, since the chocobar is meant to be deployed in a bent state in a diver suit.

Aluminum cylinders were designed and machined in pairs, wherein the outer two surfaces were made flat to interface with the rest of the testing system (heater on top and thermal sink on the bottom, while the inner two surfaces were made to follow a cylindrical surface of radius of curvature corresponding to the one of maximal bending of the particular Chocobar ($R1=50$ mm and $R2=250$ mm). The testing system was then used as in Brown et al. (Hollow-microsphere composite offers depth-independent superior thermal insulation for diver suits. Mater. Res. Express. 2019; 6:055314), to measure the thermal insulance of the sample.

The results show loss of thermal insulance at 30 msw of ~11% for the $R2=250$ mm and ~30% for the $R1=50$ mm chocobars. These are significantly better than the ~50% loss for 8 mm neoprene of similar thickness, but worse than the loss (<4%) noted for the flat segments. The explanation is that the chocobars are bent only in one of the two directions, and so the "teeth" are closed in only one of the directions. In the other direction, there are significant air gaps between the "teeth" rows, which make the overall material more susceptible to compression, essentially approximating collapsible air cavities within the overall structure. This explains the quantitative results rather well, as the gaps are larger for the smaller-curvature design. It also demonstrates a general limitation to the chocobar approach. Nevertheless, the thermal performance of chocobar segments is still superior to the one of neoprene of the same starting thickness, when exposed to the pressure of typical working depths.

It should also be noted that the current designs are meant to be bendable equally in both directions. If bending in just one direction is sufficient, the chocobar can be redesigned accordingly (e.g. with striations in only one direction) to eliminate this shortcoming. Alternatively, the chocobar can also be redesigned to match different radii in the two directions. This could be a further significant improvement in manufacturability, as only one type of mold would be sufficient for both basic curvatures. Essentially, one direction will be used for bending along flatter body areas, e.g. pectoral and abdominal, while the other direction on the same type of segment can be used for the limbs. However, this further improvement would come at some expense in thermal performance, as outlined in the above discussion.

The two types of segments were fitted to the body of Diver A and arranged in double layers, then encapsulated in external pockets to make the suit. The pockets were made by gluing a thin layer of neoprene (purple) to the neoprene of the 3 mm undersuit. The resulting K3 suit was field-tested by diving in the cold waters of Monterey Bay. In the field tests, Diver A always wore the K3, while Diver B wore three different commercial suits. The performance of the K3 suit was measured by recording the internal suit temperatures for both divers, and the temperature of the ambient water, using automated dataloggers. The dataloggers also recorded ambient pressure, which was converted into depth in meters of salt water. The anonymized diver biometrics are listed in Table 1.

In future work, the SOLAFLEX extra features should be incorporated into the design of the undersuit as much as possible. For example, starting from a well-built well-fitted 3 mm commercial suit as the undersuit, would ultimately offer additional improvements to the overall performance of chocobar suits. If even more protection is needed at some tradeoff with ergonomics, the undersuit thickness can be increased to 4 or 5 mm. A separate line of advance would be to replace the second chocobar glass layer inside the pockets with a chocobar layer incorporating solid ceramic microspheres. This change should lead to near-neutral buoyancy, regaining K2's ergonomics advantage in weight distribution. Diver A reported that ~13 kg of ballast was necessary to compensate for K3's large positive buoyancy. Switching to a glass/ceramic combination of chocobars would thus significantly decrease the ballast needed, as well as rebalance the weight distribution more advantageously. During the field tests, Diver A wore a commercial 3 mm neoprene hood. A better option would be the design of an open-face helmet using a 3 mm hood as the undersuit, and then adding chocobar protection in external pocket by the now established approach. Such a change should contribute significantly to the suit's overall thermal performance.

Measurements of the radius of human body curvatures showed that chocobar designs based on just two values of that radius are sufficient to cover most of the human body. Respective molds were designed, 3D-printed, and used to cast prototypes. The prototypes were characterized for thermal insulation under pressure and then used to construct a new suit, the K3, by the same external-pocketing approach. The K3 suit was field-tested against three commercial neoprene suits by diving in pairs and recording temperature difference and ambient pressure. The results showed that K3 is superior in thermal protection and ergonomics to a 7/6 mm neoprene suit, on par with an 8 mm neoprene suit in thermal protection but superior in ergonomics, and less thermally protective but more ergonomic compared to a 15/7.5 mm neoprene Long-Johns suit. K3 offers a huge gain in manufacturability, a substantial gain in thermal protection, and same flexibility but degraded buoyancy ergonomics, compared to the K2. Overall, K3 is a major development in suit technology, which should be of great interest to military, commercial, and recreational divers.

This written description uses examples to describe the disclosure, including the best mode, and also to enable any person skilled in the art to make and use the disclosure. Other examples that occur to those skilled in the art are intended to be within the scope of the present disclosure if they have structural elements that do not differ from the same concept, or if they include equivalent structural elements with insubstantial differences. It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A flexible, thermally-insulating composite article comprising:
   a base layer;
   a plurality of teeth extending from the base layer, the plurality of teeth comprising a carrier polymer matrix and a plurality of dispersed microspheres in the range of 5 to 24 volume percent;
   grooves extending between the teeth to enable the teeth to converge; and
   wherein the plurality of dispersed microspheres are solid.

2. The composite article of claim 1, the carrier polymer matrix comprising a siloxane polymer or a polyurethane.

3. The composite article of claim 1, wherein the carrier polymer matrix is polydimethylsiloxane.

4. The composite article of claim 1, wherein the plurality of dispersed microspheres are solid and hollow.

5. The composite article of claim 1, wherein the plurality of dispersed microspheres comprise glass microspheres.

6. The composite article of claim 1, wherein the plurality of dispersed microspheres comprise ceramic microspheres.

7. The composite article of claim 1, wherein the plurality of teeth are arranged in a symmetric grid.

8. The composite article of claim 1, wherein the plurality of teeth are in the shape of truncated square pyramids.

9. The composite article of claim 1, wherein the grooves define a concave filleted surface between adjacent teeth.

10. The composite article of claim 1, wherein the plurality of dispersed microspheres are glass or ceramic microspheres; wherein the plurality of teeth are arranged in a symmetric grid and are in the shape of truncated square pyramids; and wherein the grooves define a concave filleted surface between adjacent teeth.

11. A diving suit comprising:
    a suit base layer;
    at least one pocket; and
    at least one flexible, thermally-insulating composite pad within the at least one pocket;
    wherein the at least one composite pad comprises:
    a pad base layer;
    a plurality of teeth extending from the pad base layer, the plurality of teeth comprising a carrier polymer matrix and a plurality of dispersed microspheres in the range of 5 to 24 volume percent;
    grooves extending between the teeth to enable the teeth to converge; and
    wherein the plurality of dispersed microspheres are solid.

12. The diving suit of claim 11, wherein the suit base layer and the at least one pocket comprise neoprene.

13. The diving suit of claim 11, the-carrier polymer matrix comprising a siloxane polymer or a polyurethane.

14. The diving suit of claim 11, wherein the carrier polymer matrix is polydimethylsiloxane.

15. The diving suit of claim 11, wherein the plurality of teeth are arranged in a symmetric grid and comprise truncated square pyramids.

16. The diving suit of claim 11, wherein the grooves define a concave filleted surface between adjacent teeth.

17. A method of producing a diving suit comprising:
    providing at least one flexible, thermally-insulating composite pad to at least one pocket of a diving suit precursor, wherein the diving suit precursor further comprises a diving suit base layer;
    wherein the at least one composite pad comprises:
    a pad base layer;
    a plurality of teeth extending from the pad base layer, the plurality of teeth comprising a carrier polymer matrix and a plurality of dispersed microspheres in the range of 5 to 24 volume percent;
    grooves extending between the teeth to enable the teeth to converge; and
    wherein the plurality of dispersed microspheres are solid.

18. The method of claim 17, wherein the carrier polymer matrix is polydimethylsiloxane having the plurality of dispersed microspheres comprised of glass or ceramic microspheres dispersed in the carrier polymer matrix.

19. The method of claim 17, wherein the plurality of teeth are arranged in a symmetric grid and comprise truncated square pyramids.

* * * * *